United States Patent [19]

Heim

[11] 4,069,444

[45] Jan. 17, 1978

[54] ULTRASONIC POWER GENERATOR

[75] Inventor: Richard C. Heim, Ellicott City, Md.

[73] Assignee: Westinghouse Electric Corporation, Pittsburgh, Pa.

[21] Appl. No.: 691,675

[22] Filed: June 1, 1976

[51] Int. Cl.[2] .............................................. H02K 33/00

[52] U.S. Cl. .................................... 318/114; 318/116; 318/118; 310/316; 310/26

[58] Field of Search ............... 318/118, 114, 116, 130, 318/128, 132; 310/8.1

[56] References Cited

U.S. PATENT DOCUMENTS

| | | | |
|---|---|---|---|
| 3,129,366 | 4/1964 | Fry | 318/118 X |
| 3,129,367 | 4/1964 | Der | 318/130 |
| 3,152,295 | 10/1964 | Schebler | 318/118 |
| 3,271,644 | 9/1966 | McShane | 318/114 |

*Primary Examiner*—Donovan F. Duggan
*Attorney, Agent, or Firm*—C. M. Lorin

[57] ABSTRACT

An ultrasonic power generator for operation at a one and a half kilowatt power output from a 220 volt, 50 hertz AC line comprising a transducer coil impedance associated with a resonant capacitor, said generator being generally designed for a one kilowatt power output from a 110 volt, 60 hertz AC line. The generator circuit includes at least one thyristor for switching the resonant capacitor terminals and an oscillating circuit having a time basis including said capacitor designed for circulating a high frequency current at the desired ultrasonic operating frequency sufficient to generate one and a half ohmic kilowatts. A small high Q inductance is added to the inductive reactance of said transducer coil for adjustment to the capacitance values of the oscillating circuit.

1 Claim, 1 Drawing Figure

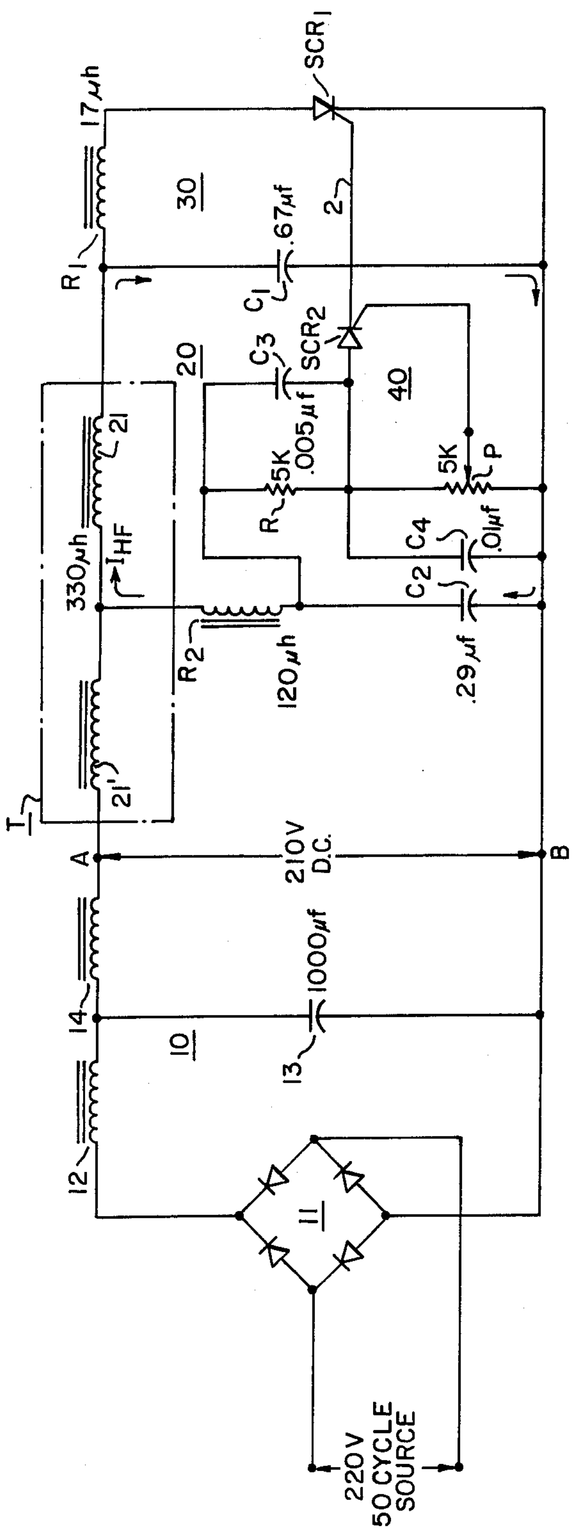
SCR1
17μh
30
.67μf
2
R1
C1
C3
SCR2
20
40
.005μf
21
5K
5K
P
R
C4
.01μf
330μh
IHF
C2
R2
120μh
.29μf
21'
T
A
210V
D.C.
B
1000μf
14
10
13
12
11
220V
50 CYCLE
SOURCE

ULTRASONIC POWER GENERATOR

BACKGROUND OF THE INVENTION

The present invention relates to power supply generators for ultrasonic electromechanical transducers in general, and more particularly to such power supply generators as can be plugged into the common utilities network such as 110 volt/60 hertz in the United States or the 220 volt/50 hertz network more currently used in Europe. The invention is especially usable for ultrasonic cleaning applications, and could be used in conjunction with electromechanical transducers of the type described for instance in U.S. Pat. No. 3,406,302 issued on Mar. 15, 1966 to R. J. Lanyi et al.

Typically, such transducers are used in surface cleaning of workpieces by ultrasonic vibrations.

INdustrial applications of ultrasonic cleaning include: removing drawing-lubricants from carbon-steel wire for steel-belted tires, aluminum welding wire, alloy welding wire, stainless steel welding rods, stranded copper wire, magnet wire, and similar such drawn and extruded material; it is also known to use the ultrasonic cleaning method to clean copper-clad aluminum coaxial cable, to remove mill scale from steel wire rod and to clean integrated circuits and electrical connectors of longitudinal configuration. Typically, in ultrasonic cleaning, a transducer creates alternately low and high pressure conditions in a liquid preferably of low viscosity, to convey vibrations from the transducer to the workpiece to be cleaned. On the negative side of this alternating cycle, pressure is reduced to less than the vapor pressure of the liquid, forming microscopic voids or bubbles. A half cycle later, the pressure in this same zone becomes positive, and the vapor bubbles implode — bursting inwardly — a reaction which is called "cavitation." It is this cavitation, with the accompanying phenomena of pressure and heat at each point of implosion, that creates the "scrubbing" action in ultrasonic cleaning systems. This action, in conjunction with the proper liquid, provides a higly efficient cleaning method. The liquid selected for ultrasonic cleaning can be either a water-based (aqueous) solution or a solvent such as chlorinated hydrocarbons or Freon (solvent). When a solvent is used for cleaning, drying of the workpiece may be necessary to minimize solvent escape to the atmosphere for safety and health reasons, and to reduce operational costs by minimizing solvent losses. This involves a closed loop unit to recapture solvent from the drying air, condense it, and return it to the total system.

The fluid coupled between the active face of the transducer and the workpiece represent a load which as seen from the power supply enacting the transducer is reflected back in the form of an effective resistance which has to be accounted for in the generation of power at ultrasonic frequency to drive the transducer.

Moreover, the ultrasonic power supply generator is often used to drive several transducers in parallel in order to increase the utilization factor but also in order to be able to accommodate different workpieces at the same time.

Besides, another requirement for an ultrasonic power supply generator is to accommodate with the same power supply different transducer coils, in particular transducers of different power capability. As a result, the power supply generator must be capable with the internal circuit components to drive transducer coils of much different sizes and with loads falling within a wide power range.

An object of the present invention is with a given basic electrical circuitry and a given alternative current voltage source to provide a power supply generator of broadened ultrasonic power output range.

Another object of the invention is to provide a transformerless power supply generator which is effective to provide a given maximum ultrasonic power output with a 110 volt/60 hertz voltage source as well as with a 220 volt/50 hertz voltage source.

SUMMARY OF THE INVENTION

A transformerless ultrasonic power generator adapted from a standard 110 volt, 60 cycle power supply design to fit a standard 220 volt, 50 cycle power supply, including a main resonant capacitor having a capacitance first reduced in proportion to the increased standard inputted voltage, and secondly increased in proportion to a given increased circulating current within the LC resonant network, said LC resonant network including the main capacitor and the ultrasonic transducer coil, thereby to obtain an increased power output while maintaining on the internal circuit components acceptable peak voltage values.

SHORT DESCRIPTION OF THE DRAWING

The FIGURE shows a specific circuitry of the ultrasonic power generator according to the present invention in its higher voltage input and higher power output capability.

DESCRIPTION OF THE PREFERRED EMBODIMENT

The FIGURE represents circuitry typical of the ultrasonic generator according to the invention. This circuit embodies generally known principles such as found in U.S. Pat. Nos. 3,129,366 of W. C. Fry and 3,129,367 of C. F. Der, both assigned to the same assignee as the present invention. For the purpose of describing the applicable prior art circuitry, the Fry and Der patents are hereby incorporated by reference.

Thus, the power supply includes (1) a source of constant current 10, (2) a resonant charging network 30 including a reactor $R_1$, a capacitor $C_1$ discharged by a thyristor switch $SCR_1$ triggered by a triggering circuit 40 including a triggering thyristor switch $SCR_2$ and (3) an LC oscillating network 20 including capacitor $C_1$, an auxiliary capacitor $C_2$ and the transducer coil 21 generating ultrasonic power to the load (not shown). The voltage impressed across the charging capacitor $C_1$ during charging thereof by the constant current source 10 is applied across the inductance of the load 21, an inductor $R_2$ and capacitor $C_2$.

To form the triggering circuit 40, a potential divider comprising resistor R and potentiometer P is mounted between the terminals of capacitor $C_2$. Capacitors $C_3$ and $C_4$ are connected in parallel with R and P, respectively. The junction J between $C_3$ and $C_4$ is connected to the anode of $SCR_2$. The moving arm of potentiometer P applies an adjustable gating voltage to $SCR_2$ and determines the firing angle of $SCR_2$, thus the rate of charging of $C_1$ by the instant of triggering of $SCR_1$, as generally known. While there is a repetitive alternative charging and discharging of capacitor $C_1$ due to the operation of the switch $SCR_1$, there is a concurrent power transfer from the voltage power supply to capacitor $C_1$ and coil 21 of the transducer. The transducer includes two coils, 21 and 21′ of such size that this power transfer operates at the resonant frequency of the LC resonant circuit 20, as determined by load requirements, for instance 20 Khertz. The transducers in fact operate under load when coil 21 is coupled with an ultrasonic cleaning bath and a workpiece therein to be cleaned. Coil 21′ is a polarization coil used to provide direct current bias in the transducer.

In this particular instance, the generator is assumed to be applied with power from a 220 volt, 50 cycle network with conversion into direct current by a full wave rectifier 11, filtered by a choke 12 and a capacitor 13. Another choke 14 prevents high frequency current from being fed back to the source. Constant current is supplied between terminals A and B, which typically are at 210 volt DC. Such constant current DC source is applied to charging capacitor $C_1$ via the transducer coils 21 and 21′ which typically have 18 turns. Coil 21, the effective ultrasonic wave generating coil, is energized by the high frequency current $I_{HF}$ generated within the oscillating circuit 20. (Coil 21′ is also assumed to have 18 ampere turns.) From the Der and Fry patents, it is clear that while capacitor $C_1$ is being alternately charged and discharged at a frequency determined by the adjustment of potentiometer P connected to the gate of triggering device $SCR_2$, a high frequency current $I_{HF}$ is generated in the loop of oscillating circuit 20. If $R_{eff}$ is effective resistance reflected back by the load during transducer operation, the energy consumed by the oscillating circuit is $R_{ff}I^2HF$.

Having described the overall circuit in terms of the prior art, the circuit of FIG. 1 will now be described and analyzed in terms of the invention.

Normally, the circuit just described is being used with a utility power supply of 110 volts and 60 cycles. In such a case, reactor $R_1$ is chosen to be 0.27μH, capacitor $C_1$ typically may be selected to be 1.1μF, for an inductance in coil 21 of 330μh, thereby to generate $I_{HF}$ at the desired ultrasonic frequency of operation, typically 20 Khertz. Interaction through the triggering circuit 40 with the switching device $SCR_1$ will occur at the same rate, as generally known. Such a generator, supplied with 110 volts, 60 cycles is to be used with different sizes of coils 21, 21′, in order to accommodate different power ratings prescribed by the user. Typically, the range of coils to be used includes 200W, 300W, 600W and 1KW. Several such circuits may be combined in a single unit to form a multi-kilowatt generator. In all instances the circuit component values are such that voltages are the same for all power ratings, taking into account that circuit impedances charge as the inverse of power rating. This scheme is used so that the ratio of the inductive reactance to the effective resistance $R_{eff}$ at the transducer electrical terminal works the same when a coil of more, or lower, ampere turns is used, thereby to match the transducer impedance to circuits of different power ratings. As a result when a 1KW circuit is used as a reference for the maximum constraints, circuits of any practical power rating can be constructed merely by following the inverse ratio of the power ratings for the determination of the component values.

Having designed a line of ultrasonic generators which satisfy selected power ratings desired by the user and as can be plugged into the 110 volt, 60 cycle power supply, the problem is for the manufacturer to provide ultrasonic generators which are readily available for plugging into a 220 volt, 50 cycle power supply as found in countries other than the United States. In addition, with a 110 volt, 60 cycle power supply, 1 Kwatts is considered a maximum acceptable output power. At 1.5 KW, for instance, the circuit designed would draw under 110 volts as much as 25 amperes. The same 110 volts equipment can be used under 220 volts with the help of a transformer reducing the voltage to half. However, it is not desirable to use a transformer because of weight, size and cost. The problem is then how to directly use a given circuitry with twice the voltage supply as was originally designed.

The present invention proposes, with an external power supply of higher voltage, through a minimum rearrangement of the basic circuitry to provide an acceptable level of voltage on the circuit components, in particular the $SCR_1$ switch, while taking advantage of the higher voltage available externally to make it possible to generate a larger power output with substantially the same basic circuitry. The solution is a trade-off between a limited increase of the voltage applied to the circuit components and an increased power output at the operting frequency, obtained from an increased circulating current $I_{HF}$ this yielding an increased $R_{eff}$ $I^2HF$.

It is known in an oscillating circuit, under a given DC voltage applied to it that to increase, or decrease, the circulating current $I_{HF}$, the inherent impedance should be increased, or decreased, in the same proportion (e.g. the reactance is decreased or increased when the inductance is increased or decreased) at the resonance frequency. The circulating current $I_{HF}$ is a function of the tank circuit characteristics and expresses itself as follows:

$$I_{HF} = 0.707\ V_{AB} 2\pi F C_1 \quad (1)$$

where $F$ is the resonant frequency and $C_1$ is the capacitance. The effective transducer power is $$P = R_{eff} \times I^2 HF. \quad (2)$$

It appears from (1) that in order to match the voltage increase with the same $I_{HF}$ We must reduce $C_1$, thus from 1.1μF in the 110V situation to 0.55μF in the 220V situation.

The peak voltage $V_{SCR_1}$ on $SCR_1$ due to the oscillating circuit is:

$$V_{SCR_1} = I_{HF} X_{C_1} \quad (3)$$

where $X_{C_1}$ is the impedance of capacitor $C_1$ at the frequency $F$.

The level of $V_{SCR_1}$ is increased up to a reasonable level of 500 volts by increasing $C_1$ from 0.55μF to the desired value 0.67μF thus establishing an increased $I_{HF}$, which provides an increased power output on the transducer.

The value 0.67μF selected represents as desired about 20% of an increase in $I_{HF}$ and in terms of $R_{eff}I^2HF$ a 50% power increase, namely from 1 Kwatt to 1.5 Kwatt as predicted. Since the transducer coil 21 is the same as the one used in the 1 KW design, an adjustment of inductance is necessary with the new combined values of $C_1$ and $C_2$. This is achieved by inserting in the oscillating circuit 20, an inductance $R_2$, namely of 120μH which is a high Q inductance providing the required oscillator resonant frequency. With such circuitry, the power switch $SCR_1$ is under a peak forward voltage of 500 volts, but this is a level it can withstand. The constant current source is conventionally modified to fit a 220 volt power supply. For instance $R_1$ receives 0.17μH, instead of 0.27μH under 110 volts.

It appears from the preceding description that without substantially changing the basic circuitry of a 1 KW and 110 volt generator, the latter becomes at 220 volts a transformerless 1.5 KW ultrasonic generator, and the entire power line of production is also uprated and available within the same maximum constraints defined in the 1.5 Kwatt generator just described.

I claim:

1. In an ultrasonic power generator adapted for operation under a 110 volts, 60 cycle standard power supply comprising a constant current source having input terminals for coupling with said standard 110 volts power supply and output terminals for delivering constant current under a voltage related to the voltage at said input terminals, a switching thyristor responsive to said related voltage, a transducer coil for converting high frequency electrical power into acoustic energy at a desired power output and operating frequency; an LC oscillating network including a main capacitor and the impedance of said transducer coil, the resonant frequency of said oscillating network corresponding to said operating frequency; a resonant charging network including said switching thyristor and said main capacitor and a triggering circuit for gating said switching thyristor to charge said main capacitor at the rate of said high frequency electrical power, the combination of:.

said input terminals being adapted for coupling with a standard 220 volts, 50 cycle power supply;

said main capacitor having a capacitance reduced in proportion to the voltage ratio between said related voltage for a standard 110 volt power supply to the related voltage for a standard 220 volt power supply, and increased in proportion to the high frequency circulating current required in said LC oscillating network to cause, under said 220 volt standard power supply, an increase of said related voltage to generate substantially said power output, said increase being within the voltage constraints of said switching thyristor; and a high Q inductance added to said LC network in order to match the required resonant frequency.

* * * * *